United States Patent Office 3,540,846
Patented Nov. 17, 1970

3,540,846
PROCESS FOR THE MANUFACTURE OF TITANIUM DIOXIDE PIGMENTS FROM HYDROCHLORIC ACID SOLUTIONS CONTAINING TITANIUM
Edgar Klein, Odenthal, Achim Kulling, Opladen, and Helmut Steinhausen, Odenthal, Germany, assignors to Titangesellschaft m.b.H., Leverkusen, Germany, a corporation of Germany
No Drawing. Filed Feb. 3, 1969, Ser. No. 796,144
Claims priority, application Germany, Feb. 15, 1968, 1,667,856
Int. Cl. C01g 23/06, 23/08
U.S. Cl. 23—202                              3 Claims

ABSTRACT OF THE DISCLOSURE

The invention is concerned with a process for the hydrolysis of hydrochloric acid solutions containing titanium, hereinafter referred to as titanium chloride solutions, which have been obtained by the digestion of titanium ores with concentrated hydrochloric acid.

BACKGROUND OF THE INVENTION

The digestion of titanium ores, especially ilmenite, with hydrochloric acid, has been carried out heretofore with over 32% and preferably 37–38% hydrochloric acid, such as described, for example in the German Pat. No. 1,083,244. The titanium chloride solution so obtained may be freed, in a manner known as such, from the main portion of iron values by crystallization of $FeCl_2 \cdot 4H_2O$ and subsequently subjected to hydrolysis.

The most important methods used heretofore for the hydrolysis of titanium chloride solutions may be subdivided into two groups:

(1) Introducing the titanium chloride solution to be hydrolyzed into hot water whereby the nuclei necessary for hydrolysis are formed in situ.

(2) Hydrolyzing the titanium chloride solution after mixing it with an externally prepared nuclei solution.

Both types of procedure have been known for a long time.

Methods which belong to the first group are described, for example, in the British Pats. Nos. 550,995 and 576,-588, in the U.S. Pat. No. 2,426,788 as well as in the German pending Application No. 1,225,155. According to these processes the nuclei are formed simultaneously with the introduction of the titanium salt solution into the hot water. The amount of hot water necessary for this and the dilution of the titanium salt solution resulting therefrom are relatively extensive. The principal disadvantage inherent to this method is the fact that the starting solution cannot at one and the same time have the optimum analytical composition for formation of nuclei as well as for the precipitation of titanium hydrate. In order not to be forced to accept a too far-reaching impairment of the pigment, it is necessary to compromise between the optimum conditions for nuclei formation and hydrolysis.

When operating according to the second method, the procedure consists either in adding the titanium salt solution to the hot nuclei solution in the tank, as taught by the German Pat. No. 700,918, or by reverse procedure, adding the nuclei solution to the titanium salt solution, as taught in the German Pat. No. 910,408.

A considerably greater number of nuclei is needed for the hydrolysis of titanium chloride solutions than for the hydrolysis of titanium sulfate solutions. Also there is the disadvantage that the nuclei employed, when obtained from hydrochloric acid solutions, are most efficient when they have been produced from solutions of comparatively low titanium dioxide concentration. The most suitable nuclei solutions are obtained from hydrochloric acid solutions of tetravalent titanium containing 10–15 g. $TiO_2$ per liter by heating to 80–100° C. On account of this the mixture of a titanium chloride solution with the nuclei solutions leads to a considerable dilution of the solution to be hydrolyzed. This dilution cannot be avoided according to this prior art hydrolysis procedure for it has been found that by reducing the volume of nuclei solution added to less than 20% of the solution to be hydrolyzed, a pigment of unsatisfactory quality is obtained even with optimum nuclei solutions. Moreover after precipitation of the hydrate and subsequent filtration are completed, there remains depending on the amount of nuclei added to the tank and depending also on the volume of nuclei solution, either a residual HCl filtrate of which the hydrogen chloride content corresponds to or is above that of the azeotropic mixture $HCl-H_2O$ from which, therefore, water cannot be removed by simple distillation; or else, a subazeotropic $HCl-H_2O$ mixture from which only as much water can be removed by distillation as to obtain a 20% hydrochloric acid solution.

Should it be desired to use these residual HCl filtrates in a subsequent digestion, it would be necessary to increase their acid concentration by adding hydrogen chloride or a concentrated hydrogen chloride-water mixture. Moreover if conditions prevail such that digestion of fresh ore is to be carried out with more than 32%, preferably 37–38%, hydrochloric acid, then the process can be carried out economically only if the additional hydrogen chloride necessary to increase the acid concentration of these filtrates is recovered from the crystallized $FeCl_2 \cdot 4H_2O$.

For the purpose of economically recovering a super azeotropic hydrochloric acid, the volume of the titanium chloride solution may only be increased by 10–20% at the most during hydrolysis, which—as explained above in detail—is not possible by the prior art methods without loss of pigment quality.

SUMMARY OF THE INVENTION

It has been discovered however that the volume of titanium chloride solution added during hydrolysis may be increased by as much as 20% so as to provide a residual HCl filtrate of relatively high acid concentration but without loss in pigment quality by adding the titanium chloride solution to the nuclei solution initially at a relatively slow rate. This may be done either by adding initially a first portion or fraction of the titanium chloride solution slowly to the nuclei solution and thereafter adding the remaining portion of titanium chloride solution slowly or rapidly, as the case may be; or as an alternative, all of the titanium chloride solution may be added at a very slow rate.

According to a preferred form of the invention this problem has been solved by adding slowly from $\frac{1}{10}$–$\frac{1}{3}$ of the titanium chloride solution to all of the nuclei solution in the receiving tank at a starting temperature above 90° C., during a period of more than 20 minutes, preferably 40–80 minutes, multiplied by a factor $V_1/V_2$ wherein $V_1$ is the volume of the slowly added titanium chloride solution added and $V_2$ the total volume of the titanium chloride solution to be hydrolyzed the starting temperature being maintained substantially constant in the tank during this period. The partial mixture thus obtained is further processed in either of two ways depending on the volume of nuclei solution in the receiving tank, thus: (a) in case the nuclei solution in the receiving tank has a volume of less than 20%, on the basis of the total titanium chloride solution to be hydrolyzed, the balance of the titanium chloride solution is added directly to this partial mixture, or: (b) in case the volume of nuclei solution in the receiving tank is excessive especially exceeding 20%, at least that portion in excess of 20%, either in the form of water or weak hydrochloric acid or both is removed, preferably by distillation, and thereafter the nuclei solution thus concentrated is mixed with the residual titanium chloride solution.

The subsequent mixing of the balance of the titanium chloride solution with the partial mixture may take place at any desired speed and in any desired manner, after which hydrolysis is completed by heating the nucleated solution at a temperature close to its boiling point.

DESCRIPTION OF PREFERRED EMBODIMENT

In a preferred form of carrying out the process, at first more than $\frac{1}{5}$ of the titanium chloride solution is added to a nuclei solution maintained at about 100° C., in a receiving tank which is also being kept at a temperature close to 100° C. In this way the volume of solution to be hydrolyzed will have been increased at the end of hydrolysis by 20% at the most. Higher dilutions are avoided by either of the two ways hereinabove mentioned; the one by limiting initially the volume of the nuclei solution in the receiving tank to below 20% in reference to the total titanium chloride solution to be hydrolyzed. Using this procedure the number of nuclei is kept as small as possible. Incidentally this small number of nuclei would not be sufficient to produce pigments of good quality, if opearting according to previous processes. Moreover the slow, exactly dosed addition of the titanium chloride solution to a given low volume of nuclei solution in the receiving tank according to the process of this invention leads to an important improvement of the pigments since, on the one hand, additional nuclei are produced during the initial titanium chloride addition and, on the other hand, the growth of the nuclei particles is influenced in a favorable sense.

The second possibility of avoiding dilution is to reduce the amount of water introduced in excess by the nuclei solution in the receiving tank, as for example by distillation, preferably in a vacuum, following the slow addition of the first part of the titanium chloride solution to the nuclei solution. This latter procedure for carrying out the present invention is made possible by the relatively great stability of the partial mixture. As long as the hydrochloric acid content of this mixture is still below that of the azeotropic mixture $HCl-H_2O$, water may be distilled off so that following hydrolysis a super-azeotropic $HCl-H_2O$ mixture is obtained. The volume of the nuclei solution introduced into the receiving tank may therefore also be larger than 20%. This is desirable under certain circumstances when special requirements of the pigment are in order, for example, when pigments of particularly small particle size are to be manufactured.

As mentioned above the high nuclei requirement of titanium chloride solutions is due to the fact that, even at an early stage of hydrolysis, flocculation of the hydrate particles grown from the individual nuclei takes place and that as the hydrolysis proceeds several hydrate particles intergrow with each other. Hence the number of hydrate particles present at the end of the precipitation is significantly less than the number of nuclei initially present. However the precipitating method, according to this invention, has the effect that less hydrate particles grow together than in the prior art processes. It has been found that following the slow addition of $\frac{1}{10}-\frac{1}{3}$ of the titanium chloride solution into the hot nuclei solution in the receiving tank at about 100° C., the flocculating and intergrowing phenomena are largely terminated. Consequently the course of hydrolysis can no longer be influenced significantly and may, therefore, be carried to finality in any desired manner.

Thus it is not decisive, for pigment quality, whether the balance of the titanium chloride solution is added hot or cold, fast or slowly, into the partial mixture in the receiving tank. Moreover it is possible to introduce the balance of the titanium chloride solution into a second receiving tank and to add the partial mixture from the first receiving tank to it. Good results are obtained even when the partial mixture has been cooled or after it has been kept for a considerable period at ambient temperature.

It is important however for the success of the hydrolysis according to the process of this invention, that, during the slow addition of the first part of the titanium chloride solution to the nuclei solution in the receiving tank, the temperature of the receiving tank does not drop below the temperature of the nuclei solution in the tank. In this respect the temperature of the titanium chloride solution to be hydrolyzed is of subordinate effect owing to the low speed of addition. However should a temperature decrease occur in the receiving tank it must be compensated for immediately by heating up the tank. The rate of addition of the first part of the titanium chloride solution to the nuclei solution depends on the volume ratio of the nuclei solution to the titanium chloride solution as well as the concentration of the titanium chloride solution. The higher the concentration of the solution to be hydrolyzed and the lower the volume of the nuclei solution in the receiving tank, the slower must be the addition. The rate of increase of concentration in the receiving tank by addition of the solution to be hydrolyzed at the beginning of the hydrolysis must be maintained low in any case. With decreasing rate of addition of the titanium chloride solution the pigment quality increases up to a limiting value. Expediently, this rate of addition is not decreased to a greater extent than is necessary in order to obtain optimum quality pigments.

For hydrolysis, according to the present invention is is important that titanium chloride solutions be employed that have been obtained by digestion of ilmenite with hydrochloride acid of at least 37% HCl at temperatures of more than 75° C. and from which solutions 60–80% of the iron present in the ilmenite employed has been crystallized out by cooling in the form of $FeCl_2 \cdot 4H_2O$ and separated from the solution.

The nuclei start solution is prepared from a hydrochloric acid titanium solution i.e. a titanium oxychloride solution prepared in a manner known as such and which, besides titanium, may contain still other cations, for example, iron, magnesium, alkaline earths and/or alkalies. The mol ratio of free hydrochloric acid to titanium dioxide in this solution should be below 4 and the content of titanium dioxide between 7 and 30 g.p.l. Preferably this nuclei start solution is made from a titanium oxychloride solution prepared from titanium tetrachloride in which the mol ratio of hydrochloric acid to titanium dioxide is about 1.75. For the purpose of nuclei formation this starting solution is heated to 70–100° C. and maintained for 5 to 60 minutes at this temperature for curing. The optimum curing time depends on the chosen temperature. The higher this is, the shorter are the curing periods necessary.

In a preferred form of carrying out the process according to the invention sufficient nuclei solution of 100° C. that had been prepared immediately before its use was introduced into the receiving tank in such a way that the volume, referring to the total titanium chloride solution to be hydrolyzed was less than 20%. The temperature of the nuclei and tank were maintained at 100° C. while the first 10–25% of the solution to be hydrolyzed was slowly introduced into the nuclei solution at a uniform rate.

Since the rate of influx depends on several factors, as has been mentioned before, no definite statements can be made as to the length of time during which the addition should be made. Generally speaking, the first part of the solution to be hydrolyzed is added at a slow and uniform rate so that more than 20 minutes and more particularly from 40–80 minutes, are required for the entire titanium chloride solution to be hydrolyzed. By multiplying this time by a factor $V_1/V_2$, wherein $V_1$ stands for the volume of the first part of the solution, $V_2$ for the total volume of the solution to be hydrolyzed, the period is found within which the addition of the first part of the solution should be effected.

If, for example, the rate is chosen in such a way that the entire titanium chloride solution would have been hydrolyzed in about 80 minutes, and if the part of this solution to be added slowly were 25% then the addition of the first part would be made within 20 minutes. The addition within this period may be carried out at a uniform rate but this is not absolutely necessary.

Following this slow period of influx of the 10–25% portion of the titanium chloride solution the formation of additional nuclei as well as flocculation and intergrowth are concluded far enough so that the addition of the balance of titanium chloride solution, as mentioned before, may be carried out in any desired manner. It is expedient to add the remaining portion of the solution to be hydrolyzed as fast as possible into the partial mixture already produced. By prolonged heating—about ½ hour to 3 hours—of the entire mixture to about 105° C. the hydrolysis is concluded. After separation of the hydrate, which is washed, calcined and milled, in a manner known as such, a residual hydrochloric acid filtrate containing over 23% hydrogen chloride is obtained. By introducing into this HCl filtrate gaseous hydrogen chloride, obtained for example by thermal decomposition of crystallized ferrous chloride an HCl-filtrate of sufficiently high acid concentration can be produced for digesting additional ore.

The process according to the present invention will be explained in more detail by the following examples. The lightening power (tinting strength) of the pigments obtained were determined according to DIN 53,192.

EXAMPLE 1

1 liter of a titanium chloride solution obtained by digestion of ilmenite with 38% hydrochloric acid was to be hydrolyzed. It analyzed 150 g. $TiO_2$, of which 3 g. $TiO_2$ were in the form of $Ti^{3+}$, 25 g. Fe, 14 g. MgO and 370 g. Cl. A titanium oxychloride solution prepared from $TiCl_4$ with a mol ratio of Cl:$TiO_2$=1.75 and a $TiO_2$ content of 12.5 g.p.l. that had been heated to 100° C. for 10 minutes served as nuclei solution. To 180 ml. of this freshly prepared nuclei solution 250 ml. of the titanium chloride solution heated to 100° C. were added within 20 minutes. The balance of 750 ml. of the hot titanium chloride solution was then introduced into this partial mixture within a few minutes. Subsequently the entire mixture was heated at 105° C. for 2 hours. The precipitate obtained was filtered in the customary way, washed, calcined with the addition of 0.28% $K_2O$ at 900° C. for 2 hours and then milled. The lightening power of the pigment obtained was 780. The filtrate obtained after separation of the precipitate contained about 26% hydrogen chloride.

EXAMPLE 2

In order to show the superiority of the process of this invention over prior art processes the same titanium chloride solution as disclosed in Example 1 was used and the procedure was the same as described therein except that the entire titanium chloride solution (1000 ml.) was added within 5 minutes to 180 ml. of the nuclei solution. The pigment obtained had a lightening power of only 690. In order to obtain under these conditions a pigment having better lightening power it was necessary to increase the volume of nuclei solution as shown by the following example.

EXAMPLE 3

The same solutions as in Example 1 were used. 1 liter of the hot titanium chloride solution (100° C.) was added to 300 ml. of a freshly prepared nuclei solution. The volume of nuclei solution was thus greater than 20% of the entire solution to be hydrolyzed. The pigment so obtained showed a lightening power of 780.

EXAMPLE 4

Again the starting solutions were the same as those of Example 1. The entire titanium chloride solution was added at a uniform rate to 180 ml. of freshly prepared nuclei solution but so slowly that the addition covered a period of 80 minutes. The lightening power of the pigment thus prepared was 770.

EXAMPLE 5

In this example a different procedure was used from that described in Example 1. In this case 360 ml. of nuclei solution were introduced into the receiving vessel. After 250 ml. of titanium chloride solution heated to 100° C. had been added to the nuclei solution within 20 minutes 180 ml. water were evaporated from this partial mixture by vacuum distillation. The resulting concentrated solution was, after cooling to ambient temperature, rapidly introduced into the balance of 750 ml. of the titanium chloride solution heated to 100° C. After heating for 2 hours at 105° C. the precipitate hydrate obtained was further processed, as described in Example 1. The lightening power of the pigment obtained was 810.

The advantage of the instant process according to the invention consists particularly in the fact that in consequence of the slow addition of the solution to be hydrolyzed (either in two steps the first of which is done slowly or in one long slow step) additional nuclei are produced in situ in addition to the externally produced nuclei and also that the growth of the nuclei already present is favorably affected so that it is possible to get along with a minimum of nuclei in the receiving vessel without the loss in pigment quality that characterizes the prior art processes. On the basis of the small amount of nuclei in the receiving vessel high dilutions of the titanium chloride solution can be avoided from the start when hydrolyzing titanium chloride solutions produced with concentrated hydrochloric acid. Hence the residual super-azeotropic hydrogen chloride filtrates obtained after hydrolysis may be concentrated relatively simply and in an economical manner.

An additional advantage of the process is the high stability of the partial mixture of nuclei-titanium chloride solution as a consequence of which a part of the water may be removed from this partial mixture before hydrolysis is finished without adversely affecting pigment quality. By such concentration of solution, prior to completion of hydrolysis, even when using a large volume of nuclei solution, a residual acid filtrate may be obtained, the hydrogen chloride concentration of which is above 23%, which is sufficient for reprocessing and subsequent reuse.

While this invention has been described and illustrated by the examples shown, it is not intended to be strictly limited thereto, and other variations and modifications may be employed within the scope of the following claims.

What is claimed is:

1. A process for the preparation of hydrous $TiO_2$, suitable for the manufacture of titanium dioxide pigments, and substantially increasing the volume of titanium chloride solution to be hydrolyzed and also minimizing the number of nuclei, comprising the steps of:

(a) preparing a nuclei solution by heating a hydrochloric acid solution of tetravalent titanium containing 10–15 g. $TiO_2$ per liter to 80°–100° C., and maintaining said nuclei solution at this temperature for 5–60 minutes for curing, (b) preparing a titanium chloride containing solution by digesting a titaniferous ore, such as ilmenite, at a temperature of more than 75° C. with a hydrochloric acid solution of 37%–38% concentration and freeing the resulting digest solution of its iron values by crystallization of $FeCl_2 \cdot 4H_2O$ and separation therefrom, (c) initially adding a portion from 1/10 to 1/3 of said titanium chloride solution slowly to all of said nuclei solution at a starting temperature of from 90°–100° C. and maintaining the temperature of said starting temperature during said addition, said addition being made in a period of time defined by the formula:

$$T = \frac{KV_1}{V_2}$$

where:

T = time in minutes
K = 20–80 minutes
$V_1$ = volume of the fractional part of the solution added initially to said nuclei solution
$V_2$ = the total volume of the titanium chloride solution to be hydrolyzed, the first portion of the titanium chloride solution to be hydrolyzed being at least about 20 minutes, (c) thereafter, either (1) adding directly the balance of said titanium chloride solution to said partial mixture when the volume of the nuclei solution is less than 20% based on the titanium chloride solution to be hydrolyzed, or (2) when the volume of the nuclei solution is more than 20% based on the titanium chloride solution to be hydrolyzed, reducing that portion of the volume of said nuclei solution to 20% by distillation in a vacuum, and thereafter adding the balance of said titanium chloride solution to the said partial mixture, the time for the entire titanium chloride solution being added for hydrolyzation being from 40–80 minutes, (d) heating the resulting nucleated titanium chloride solution substantially to a temperature corresponding to the boiling point thereof to hydrolyze the titanium values and precipitate hydrous $TiO_2$.

2. In a process for hydrolyzing a titanium chloride solution according to the improvement of claim 1 wherein more than 1/5 of said titanium chloride solution is added initially to said nuclei solution at substantially 100° C. to form said partial mixture.

3. In a process for hydrolyzing a titanium chloride solution according to the improvement of claim 1 wherein said hydrous $TiO_2$ is recovered from the hydrolyzed solution by filtration and the residual hydrochloric acid filtrate is concentrated by adding hydrogen chloride-water vapor thereto, said hydrogen chloride-water vapor produced by thermal decomposition of the ferrous chloride separated, and employed for a fresh digestion.

References Cited

UNITED STATES PATENTS

| | | | |
|---|---|---|---|
| 2,285,486 | 6/1942 | Barksdale et al. | 23—202 |
| 2,303,305 | 11/1942 | Tillmann et al. | 23—202 |
| 3,407,033 | 10/1968 | Ruter et al. | 23—87 |

FOREIGN PATENTS

| | | |
|---|---|---|
| 513,867 | 10/1939 | Great Britain. |
| 700,978 | 1/1941 | Germany. |
| 506,093 | 9/1954 | Canada. |

EDWARD STERN, Primary Examiner

U.S. Cl. X.R.

23—87; 106—300